United States Patent [19]

Born

[11] 4,431,257

[45] Feb. 14, 1984

[54] DEVICE FOR PROTECTING AN OPTICAL OR INFRARED WINDOW AGAINST LASER RADIATION

[75] Inventor: Gunthard Born, Munich, Fed. Rep. of Germany

[73] Assignee: Messerschmitt-Boelkow-Blohm Gesellschaft mit beschraenkter Haftung, Munich, Fed. Rep. of Germany

[21] Appl. No.: 297,627

[22] Filed: Aug. 31, 1981

[30] Foreign Application Priority Data

Oct. 2, 1980 [DE] Fed. Rep. of Germany ....... 3037205

[51] Int. Cl.$^3$ .............................. G02B 1/06; G02B 5/10
[52] U.S. Cl. .................................... 350/1.5; 350/310; 350/312
[58] Field of Search ............... 350/1.5, 312, 267, 310, 350/584, 588; 252/587, 582, 589

[56] References Cited

U.S. PATENT DOCUMENTS

| 1,530,441 | 3/1925 | Thomson | 350/310 |
| 1,565,590 | 12/1925 | Ritterrath | 350/1.5 |
| 1,657,776 | 1/1928 | Wolfe et al. | 350/1.5 |
| 3,914,010 | 10/1975 | Zeller | 350/312 |
| 4,065,207 | 12/1977 | Zauitsanos et al. | 350/312 |
| 4,288,953 | 9/1981 | Whiteford | 350/312 |
| 4,310,215 | 1/1982 | Kelley | 350/1.5 |

*Primary Examiner*—Jon W. Henry
*Attorney, Agent, or Firm*—W. G. Fasse; D. H. Kane, Jr.

[57] ABSTRACT

A window which is transparent to radiation in the visible, optical and near infrared range but not transparent to the radiation of a laser, is protected against distruction or damage by the laser radiation. For this purpose the window itself is constructed of at least two layers of solid optical material which is also transparent to the high energy laser radiation. These layers form a cooling channel through which a gaseous or liquid coolant flows. The coolant is transparent to the visible and near infrared range, but opaque to the laser radiation.

11 Claims, 5 Drawing Figures

DEVICE FOR PROTECTING AN OPTICAL OR INFRARED WINDOW AGAINST LASER RADIATION

CROSS-REFERENCE TO RELATED APPLICATION

The present application is based on German Patent Application P 3,037,205.5, filed in the Federal Republic of Germany on Oct. 2, 1980. The priority of said German filing date is claimed.

BACKGROUND OF THE INVENTION

The present invention relates to a device for protecting an optical or infrared window against laser radiation emanating from infrared lasers.

Windows of laser optical devices are transparent for the visible light spectrum and also in the near infrared spectral zone. However, such windows are supposed to be non-transparent or opaque for the infrared range in which infrared lasers operate. Such lasers operate, for example, in the range of 3 to 5 $\mu$m or in the range of 9 to 11 $\mu$m. When optical windows are irradiated by such laser energy, particularly in weapons systems, the windows absorb the radiation almost completely, whereby the optical materials of which the windows are made are very rapidly destroyed due to the low heat conducting ability and due to the low melting or rather evaporating temperature, whereby particularly the optical surface is rapidly destroyed. Thus, the optical windows lose their optical qualities by becoming non-transparent or opaque or may even shatter due to the thermal tensions. Thus, such windows become useless for the intended purpose.

OBJECTS OF THE INVENTION

In view of the foregoing it is the aim of the invention to achieve the following objects singly or in combination:

to construct an optical window in such a manner that it will remain functional even if it is exposed to laser radiation;

to construct such an optical window in such a manner that any optical and/or electronic components located behind the window are also protected against such laser radiation; and to provide a method for effectively cooling an optical window.

SUMMARY OF THE INVENTION

According to the invention there is provided a device for protecting an optical or infrared window which is transparent in the near infrared zone, against damage or destruction by laser radiation. Such a device comprises first and second layers of solid material which is transparent to optical and near infrared radiation as well as to the high energy laser radiation. The first and second layers form the optical window and simultaneously they provide a gap between the first and second layers. The gap forms a coolant flow channel which is operatively connected to a coolant supply reservoir. A gaseous or liquid coolant flows through the channel and the coolant itself is opaque to the laser radiation, but it is transparent to the visible and near infrared radiation range.

According to the method of the invention the coolant flow channel is formed in the window by making at least one wall of the flow channel transparent to laser radiation, but both walls are made to be transparent to the visible and near infrared range. A gaseous or liquid coolant is caused to flow through the flow channel in a direction extending substantially perpendicularly to the direction of the high energy laser radiation, whereby the coolant is again transparent to the visible light and near infrared radiation, but opaque to the laser radiation. The coolant is selected from the group consisting of cyclohexane ($C_6H_{12}$) or methane ($CH_4$).

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
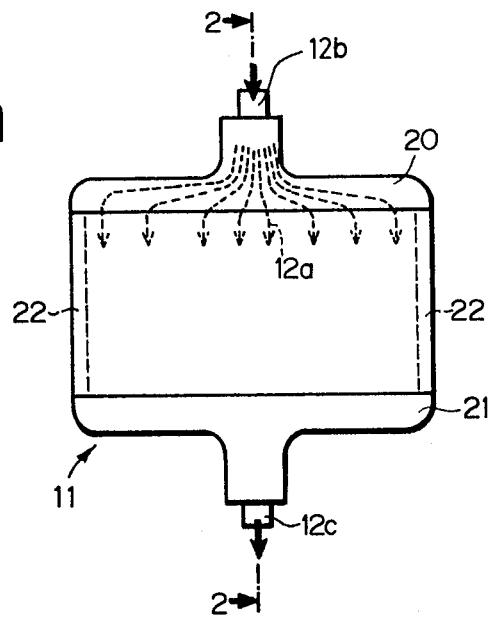
FIG. 1 is a schematic front view of an optical window cooled according to the invention.
Figure 2:
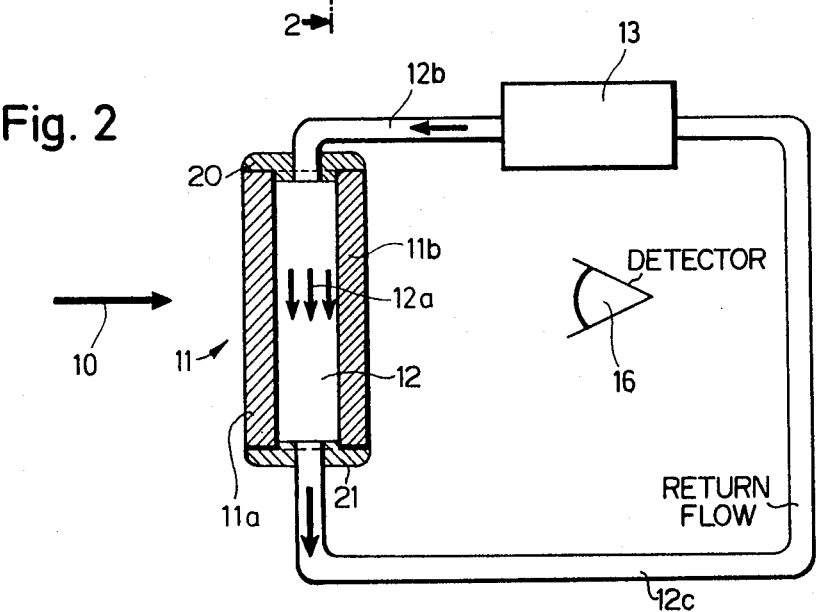
FIG. 2 is a sectional view along section line 2—2 in FIG. 1 and including a closed coolant flow circuit.

FIGS. 1 and 2 show an optical window 11 which is cooled in accordance with the teachings of the present invention. The direction of the laser radiation 10 is indicated by the respective arrow in FIG. 2 and extends perpendicularly to the plane of FIG. 1. The window 11 comprises a front wall or optical layer 11a, a rear wall or layer 11b, side walls 22, a top flange 20, and a bottom flange 21. Both optical layers or walls 11a and 11b are transparent for the spectral band or range of the utilization signal. At least the front wall 11a is also transparent to the laser radiation 10. The rear wall 11b facing the detector 16 is also transparent to the laser radiation, but may be opaque relative to such laser radiation.

The optical walls or layers 11a and 11b are made, for example, of zinc sulfide (ZnS) or zinc selenide (ZnSe) or calcium fluoride ($CaF_2$) or IRTRAN (trade name of Eastman Kodak Corporation).

The front wall 11a is spaced from the rear wall 11b, for example, by the side walls 22 and by a respective shoulder in the top flange 20 and in the bottom flange 21 to form a cooling flow channel 12. A coolant represented by the arrows 12a flows through the cooling channel 12. The width of the cooling channel 12 in the direction of the arrow 10 may be within the range of 1:10 mm, for example.

The cooling medium 12a may be liquid or gaseous. In any event the coolant must be opaque to the laser radiation in order to absorb the laser radiation for cooling purposes. At the same time the coolant must be transparent to the utilization signal within the visible and near infrared spectral range. It has been found that liquid cyclohexane ($C_6H_{12}$) or methane ($CH_4$) satisfy the foregoing conditions. An efficient cooling has been achieved if the layer thickness of the coolant 12a in the channel 12 corresponds at least to the absorption length of the radiation involved. Preferably, the thickness of the coolant layer flowing through the channel 12 should correspond to several times the absorption length. The width or spacing between the front wall 11a and the rear wall 11b of the window 11 will be selected accordingly. The absorption length is conventionally defined as the depth in the absorption medium at which the radiation has been reduced to 1/e times its original entering value, whereby "e" is equal to 2.71 the base of the natural logarithms.

It has been found to be essential that the speed of the coolant 12a flowing through the channel 12 should be controlled in accordance with the flow length which corresponds substantially to the vertical height of the walls 11a and 11b. The control should be such that the temperature increase of the coolant 12a in the channel 12 due to the irradiation by the laser beam should be smaller than 1° C. in order to avoid the formation of schlieren in the coolant which could diminish the optical quality of the window.

As shown in FIG. 2 it is preferable to provide a closed circuit for the coolant flow. Thus, a reservoir 13 is connected to the flow channel 12 by a supply conduit 12b and by a return conduit 12c. As shown, the flow direction indicated by the arrows 12a would be maintained by a circulating pump not shown. However, it has been found that a self-circulation can be maintained by the heat absorbed by the coolant as it flows through the channel 12. In that case the direction of the arrows would be reversed since the coolant would rise in the channel 12 for its return into the reservoir 13 from which the coolant would flow by gravity back into the channel 12. The heat capacity of the reservoir 13 should be very much larger than the heat resulting from the irradiation of the coolant by the high energy laser radiation. As mentioned, it has been found, that the heat-up as a result of the irradiation is sufficient for providing the necessary self-circulation in the closed flow circuit of FIG. 2.

It has been found that with the cooling according to the invention excessive temperatures of the window material forming the optical layers or walls 11a and 11b are avoided. Moreover, optical components such as the detector 16 located behind the window are also protected by the window. The detector 16 may, for example, be the eye of a human observer. Incidentally, the window or aperture means may be made, for example, of carbon in solid form.

Figure 3:
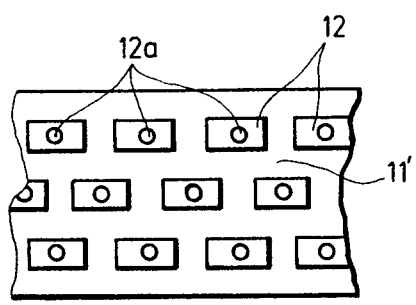
FIG. 3 is a front view of a portion of a modified window cooled according to the invention and having a substantial mechanical strength.

FIG. 3 illustrates an embodiment in which a plurality of flow channels 12 are arranged in parallel to each other. The window structure 11' of FIG. 3 has been found to be especially suitable if the mechanical loads to which the window may be exposed are substantial. The flow channels 12 may be arranged in a honeycomb type structure in the layer material of the window 11' and each flow channel 12 will conduct its own coolant flow 12a.

Figure 4:
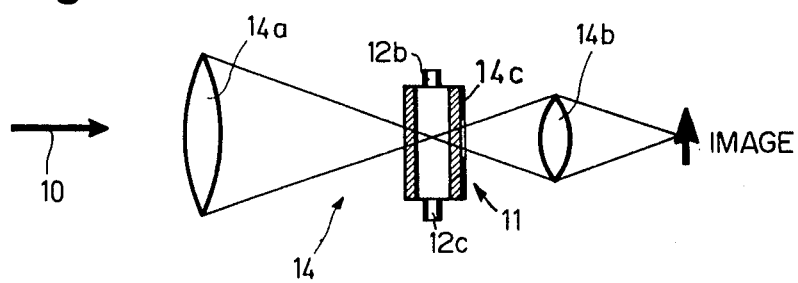
FIG. 4 illustrates schematically the location of a cooled window between the components of an objective.

FIG. 4 illustrates an optical system 14 having a first inlet lens 14a which is transparent to the laser radiation 10 and therefore the lens 14a does not absorb the laser radiation and hence is not damaged or destroyed by the laser radiation 10. The optical system 14 further comprises a second image lens 14b. The window 11 cooled according to the invention is operatively positioned between the two lenses 14a and 14b. However, the window 11 may also be located between the inlet lens 14a and the incoming laser radiation 10. In connection with optical instruments, such as cameras, it is advisable to arrange the cooled window in the ray path as shown in FIG. 4. It has been found to be advantageous to provide the window 11 with field of view aperture or shutter means 14c directly secured to the window 11 on the side facing the imaging lens 14b. Such field of view aperture or shutter means 14c block the passage of laser radiation or beams which may be incident at a large angle relative to the optical axis extending horizontally in FIG. 4.

Figure 5:
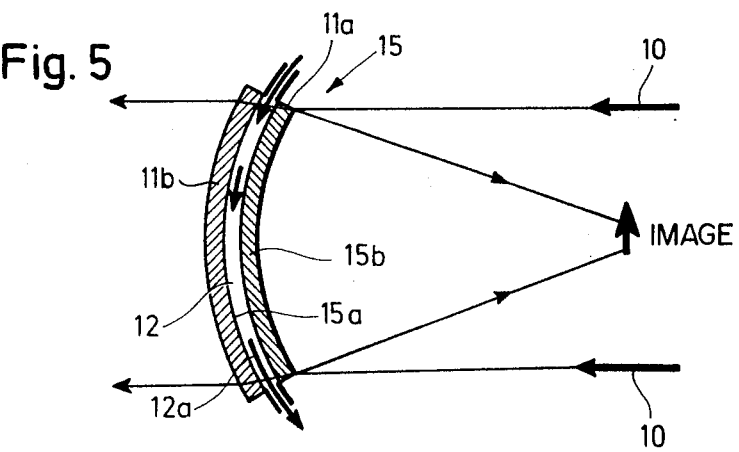
FIG. 5 shows a sectional view through a curved window cooled according to the invention and secured to a curved mirror.

The cooled optical window according to the invention may also have other shapes, for example, it may be shaped in the form of a lens or dome. FIG. 5 shows in this connection an embodiment in the form of a curved mirror 15 having a front curved window wall 11a and a rear curved window wall 11b forming the flow channel 12 therebetween through which the coolant 12a flows as described. The front wall 11a forms a layer 15b which reflects the utilization portion of the radiation 10 and which is transparent to the infrared portion of the laser radiation. The image facing inside surface of the outer wall or layer 11b is provided with a reflecting mirror 15a.

Although the invention has been described with reference to specific example embodiments, it will be appreciated, that it is intended to cover all modifications and equivalents within the scope of the appended claims.

What is claimed is:

1. A device for protecting an optical or infrared window against damage or destruction by laser radiation, comprising first and second layers of solid material at least one of said layers being transparent to optical and near-infrared radiation and to the laser radiation, a gap between said first and second layers, said gap forming a coolant flow channel, coolant supply means operatively connected to said coolant flow channel, and a gaseous or liquid coolant in said flow channel, said coolant being opaque to the laser radiation and transparent to visible and near-infrared radiation, said coolant being selected from the group consisting of cyclohexane $C_6H_{12}$ in liquid form and methane $CH_4$.

2. The device of claim 1, wherein said coolant flow channel has a width in a direction perpendicular to the coolant flow direction which width is equal at least to the absorption length of the laser radiation whereby said coolant has a thickness corresponding to said width.

3. The device of claim 1, wherein said solid material forming said layers is made of zinc selenide, or of zinc sulfide, or of calcium fluoride, or of IRTRAN (tradename).

4. The device of claim 1, further comprising conduit means operatively interconnecting said coolant flow channel and said coolant supply means to form a closed circuit for said coolant flow.

5. The device of claim 1, further comprising field of view aperture means operatively secured to said window, said aperture means comprising a material for absorbing said laser radiation, wherein said material is carbon in solid form.

6. The device of claim 1, further comprising optical means, said window being operatively arranged intermediate said optical means.

7. The device of claim 1, wherein said layers and coolant flow channel have a curved shape.

8. A method for cooling an optical window which is transparent to visible light and to near infrared radiation but opaque to laser radiation, comprising the following steps: forming a coolant flow channel through said window, making at least one wall of said flow channel transparent to laser radiation, and flowing a gaseous or liquid coolant through said flow channel in a direction extending substantially perpendicularly to the direction of the laser radiation, said coolant being transparent to said visible light and near infrared radiation, said coolant being opaque to said laser radiation and selecting the coolant from the group consisting of liquid cyclohexane or methane.

9. The method of claim 8, further comprising flowing said coolant through said flow channel at such a speed that the temperature increase of the coolant during its flow through the length of the coolant flow channel remains below 1° C.

10. The method of claim 8, further comprising forming a closed circuit between said flow channel and a coolant reservoir, and providing said reservoir with a heat capacity substantially larger than the heat resulting from the irradiation of the coolant in the coolant flow channel by the laser radiation.

11. The method of claim 10, further comprising maintaining the flow of coolant in said closed circuit by the heating of the coolant in the coolant flow channel by the laser radiation.

* * * * *